Patented June 23, 1925.

1,542,986

UNITED STATES PATENT OFFICE.

JOSEPH BRESLAUER AND GEORGES DARIER, OF GENEVA, SWITZERLAND, ASSIGNORS TO SOCIÉTÉ D'ETUDES CHIMIQUES POUR L'INDUSTRIE, OF GENEVA, SWITZERLAND.

PROCESS FOR THE MANUFACTURE OF NITROGENIC AND PHOSPHATIC COMBINATIONS.

No Drawing. Application filed September 18, 1920. Serial No. 411,074.

*To all whom it may concern:*

Be it known that we, JOSEPH BRESLAUER, citizen of Poland, residing at Geneva, Canton of Geneva, Confederation of Switzerland, and GEORGES DARIER, citizen of Switzerland, residing at Geneva, Canton of Geneva, Confederation of Switzerland, have invented certain new and useful Improvements in Processes for the Manufacture of Nitrogenic and Phosphatic Combinations, of which the following is a specification.

The invention has for its object a process for the manufacture of nitrogenic and phosphatic combinations, which are liable to be used also as single or mixed fertilizers, starting from cyanamides or their derivatives.

According to this process cyanamides are converted into suitable combinations which are easily assimilable and which do not involve the same inconveniences which are inherent to calcic and other cyanamides.

This said conversion may be obtained by very different means of which several will be specified hereinafter, the said conversion leads either to manufacture of urea and of its salts, or to intermediate and derivatived substances the fertilizing power of which have been proved practically, or finally to mixed or complete fertilizers.

The process of conversion as claimed realizes very high yield and at the same time a very reduced cost of the manufacture because of a judicious choice of the catalyzers which are used as converting agents. The same acid or basic substances may be used, after having worked as catalyzer, for a second reaction so that the cost of each of the successive operations are considerably reduced.

The choice of the catalyzers depends upon the final result to be obtained, so as to introduce into the product of the reaction those elements and those groups, which are deemed necessary. One may, therefore, manufacture a series of chemical products, passing from the nitrogenous combinations to the mixed fertilizers containing active nitrogen and soluble phosphoric acid compounds and finally to the complete fertilizers containing, together with the ammonia, urea and other assimilable nitrous combinations superphosphates, potassium, and the like.

The conversion of the metallic combinations of the cyanamide is preferably proceeded by the liberation of the cyanamide proper $H_2C.N_2$ which may be caused for instance by means of acids such as carbonic acid, which precipitates the lime into a form which is suitable for use in the manufacture of cement or for neutralization of acid solutions obtained in the course of the manufacture of urea.

It is besides advisable to employ the liquid for repeated extractions of the cyanamide which is simultaneously liberated until it is more or less completely saturated with cyanamide, in order to avoid the cost of the troublesome evaporation. To this same end compounds of lime and other salts might be added to the solutions of salts of urea, which compounds by their formation of plaster and other crystallized products absorb a certain quantity of water.

The concentrated solution of cyanamide obtained by this process may, above all in the presence of ammonia cause the formation of dicyandiamide in form of crystals, which, treated with concentrated sulphuric, phosphoric or nitric acids, may be transformed into sulphate, phosphate or nitrate of ammonia. The filtered liquid serves for another extraction and so on. These extractions may be advantageously made at a temperature of 30 to 45 degrees centigrade and it is necessary to add a small quantity of acid to the filtered solution in order to prevent its decomposition and the polymerization of the cyanamide into dicyandiamide and other noxious compounds. If for practical reasons an excess of acid is employed, it is possible to neutralize this excess by adding insoluble phosphates or compounds of potassium or ammonium, which have a fertilizing value.

The solution of the free cyanamide may equally and simultaneously be transformed into an assimilable nitrogen fertilizer by adding a certain quantity of sulphuric, phosphoric or nitric acid which subsequently is neutralized by a corresponding quantity of calcium cyanamide containing a known percentage of caclium oxide, thereby producing a nitrogenic or nitrogen-phosphatic fertilizer which can easily be manipulated and does not possess the inconvenience of the cyanamide.

According to the required effects the catalyzing agents for the transformation referred to above, may be:

(a) The mineral acids which with the metallic impurity of the cyanamide give insoluble salts, as for instance phosphoric acid, carbonic acid, sulphurous acid ($SO_2$) and the like.

(b) The acid salts such as bisulphate of sodium or potassium, the acid phosphates of potassium, sodium or ammonium, the bisulphites of sodium, potassium and ammonium and the like.

(c) Basic compounds such as caustic sodium or caustic potassium. The employment of the latter might be useful in the special case where fertilizers containing potassium are desired.

For carrying the process into practice, one may proceed for example as follows:

The calcium cyanamide in aqueous solution is treated with an acid for example carbonic acid causing the lime ($Ca(OH)_2$) to be precipitated in the form of an insoluble salt. The product is filtered and the filtered solution containing the free cyanamide may serve for other extractions of the cyanamide simultaneously liberated. A concentrated solution of cyanamide can thus be obtained. To this solution is added an acid or an acid salt such as for instance the bisulphate of sodium or of potassium, in order to convert the cyanamide into free urea or into a salt of urea, which remains in solution from which the urea may be obtained in a pure state in any known manner.

In order to make mixed fertilizer this solution may be concentrated for instance in a vacuum, there is then added an insoluble phosphate such for example as tricalcium phosphate which by the excess of bisulphate or free acid, or by the acid combined with the urea, is transformed into soluble phosphate. At the same time, there forms calcium sulphate which, when the liquid mass is concentrated, is converted into plaster of Paris by combining with two molecules of water ($2H_2O$), whereby the evaporation of the water is assisted. By this formation of plaster of Paris, the mass solidifies and forms a compact block containing in addition to the plaster, urea, phosphate and the salt of potassium or sodium according to whether the bisulphate of potassium or sodium has been employed, all these substances having fertilizer value. Their mixture, as it is obtained according to the process described, constitutes an excellent mixed or complete fertilizer.

Instead of insoluble phosphates, there can be added to the acid solution of urea any other salt, which is necessary for fertilizer or which permits the cost of evaporation to be reduced, by reason of the formation of crystalline salts including molecules of water; thus one can add for example sylvinit (a natural salt composed of chloride of potassium and sodium and salts of magnesium) to the solution of urea. Instead of using the solution of free cyanamide prepared by treating the calcium cyanamide with an acid in the diluted state and concentrating said solution by evaporation, it may be enriched as much as possible in cyanamide by employing it several times successively for the extraction of the cyanamide, the calcium cyanamide or other cyanamide compounds being simultaneously decomposed by carbonic or other acids. When the solution has once reached the desired degree of concentration, it may be allowed to stand, sometimes adding a little ammonia. Crystals of dicyandiamide form, which may be filtered out and treated with an acid such for example as concentrated sulphuric acid, phosphoric acid, nitric acid, etc., or with a mixture of an acid and an acid salt in quantity more or less equivalent to the ammonia which should form. A rapid rise in temperature is produced and an evolution of carbonic acid ($CO_2$) which, collected and compressed, may be used among others in the treatment of calcium cyanamide for the liberation of the cyanamide.

The same conversion can be effected with the intermediate and derived products (dicyandiamidine, for example) which form under these conditions, starting from cyanamide and dicyandiamide.

The solution filtered and freed from crystals of dicyandiamide can also be used again for the treatment of calcium cyanamide and the extraction of the free cyanamide.

By the treatment with sulphuric, phosphoric and other acids or the acid salts, the dicyandiamide is converted into sulphate, phosphate, acid phosphate or other salt of ammonium ($(NH_4)_2HPO_4$, $NH_4NO_3$ and the like). The excess of acid may be utilized for the preparation of superphosphates or other combinations useful for fertilizer, by neutralizing it for example by salts such as carbonates of potassium or bi- or tricalcium phosphates.

The dicyandiamide, which contains 66.6 percent of nitrogen, can be transported to any place where it is desired to use it and there converted into an ammonium salt, which constitutes a great economy in transportation.

For this conversion into salt it should be remarked that no expense for fuel is necessary. The heat evolved may on the contrary serve for other purposes, chemical or physical.

The conversion is complete and produces a very fine fertilizer.

Finally the preparation of the dicyandiamide, having the same starting point as that of urea, can be alternated with the latter.

Another way for carrying out the process consists in causing a phosphoric acid solution of cyanamide $CN-NH_2$ to react on the calcium cyanamide. When on the one hand the quantity of the phosphoric acid used for preparing the solution of cyanamide is varied, and on the other hand the quantity of calcium cyanamide which reacts on this solution is also varied, one can prepare as desired mixed nitrophosphate fertilizers in such a manner that the amount of nitrogen and soluble phosphates contained therein depend upon the amounts of phosphoric acid and calcium cyanamide employed.

The following examples show how one may proceed according to this invention to prepare nitro-phosphate fertilizers:

To an aqueous solution of 44 kgs. of cyanamide $CNNH_2$ containing 98 kgs. of phosphoric acid, there is added little by little and at the same time stirring the mixture 80 kgs. of commercial calcium cyanamide.

The mass heats gradually and when all the calcium cyanamide has been added, it takes the form of more or less solid moist granules which it is only necessary to dry and to put into sacks. The mass represents a nitro-phosphate fertilizer containing about 20 percent of assimilable nitrogen and 40 percent of phosphoric acid soluble in water and in citrates in the form of mono- and bi-calcium phosphates.

It is obvious that, in this example, it is possible to vary to a considerable extent the quantity of cyanamide $CNNH_2$, the quantity of phosphoric acid and the quantity of calcium cyanamide employed, taking care however not to add so great a quantity of calcium cyanamide as would involve the conversion of the phosphoric acid employed into insoluble tricalcium phosphates which would make it valueless for fertilizer purposes.

In the above example, the pure phosphoric acid may be replaced by phosphoric acid containing sulphuric acid such as results from its preparation by means of commercial tricalcium phosphates treated with an excess of sulphuric acid. The nitrophosphate manure obtained then contains sulphate of calcium which in no way interferes with its use for agricultural purposes.

Finally a nitrogen fertilizer which is readily assimilable by plants and which may contain a variable amount of nitrogen according to the amount of free cyanamide employed may be also obtained by causing commercial calcium cyanamide to react on a sulphuric acid solution of free cyanamide $CN-NH_2$.

In order to prepare this fertilizer, one may proceed for example in the following manner.

To an aqueous solution of 44 kgs. of free cyanamide $CNNH_2$ containing 100 to 125 kgs. of concentrated sulphuric acid, there is added little by little and at the same time stirring the mass, 100 kgs. of commercial calcium cyanamide containing about 20 percent of nitrogen. The mass heats and soon assumes the form of an almost solid pulp, which it is only necessary to dry, pulverize and put into sacks. The fertilizer obtained contains about 20 percent of assimilable nitrogen, is not hygroscopic, does not present any difficulty to being handled, and can be kept indefinitely in the air. It is obvious that in this example one may employ as desired a variable amount of free cyanamide $CNNH_2$, this quantity serving to regulate the final proportion of assimilable nitrogen in the fertilizer which it is desired to obtain.

The product obtained by the different ways described for carrying out the process is an industrial novel product which either contains only nitrogen, or nitrogen phosphoric acid and other substances that may be used for agricultural purposes. It constitutes a mixed fertilizer, in which the percentage of nitrogen and other fertilizing substances contained in it may be varied at pleasure in accordance with the raw materials used. This fertilizer does not cause the disadvantages of those containing calcium cyanamide which is the reason for its great causticity. It is composed exclusively of non-caustic materials which are easily assimilable by plants.

We claim as our invention:

1. A process for converting raw cyanamid into fertilizers consisting in introducing raw cyanamid in small quantities at a time into water, maintaining the temperature of the mixture between 30 and 40 degrees centigrade, maintaining the mixture acid by gaseous acids which produce insoluble compounds with the metallic impurities in the raw cyanamid whereby there is obtained a solution of free cyanamid, producing a very concentrated solution of free cyanamid by repetition of the preceding steps, then converting the solution of free cyanamid into a urea product by an acid agent, then introducing insoluble phosphates and thereby utilizing the acid agents for the conversion of the insoluble phosphates into soluble phosphates.

2. A process for converting raw cyanamid into fertilizers consisting in introducing raw cyanamid in small quantities at a time into water, maintaining the temperature of the mixture between 30 and 40 degrees centigrade, maintaining the mixture acid by gaseous acids which produce insoluble compounds with the metallic compounds in the raw cyanamid whereby there is obtained a solution of free cyanamid, producing a very concentrated solution of free cyanamid by repetition of the preceding steps, then converting the solution of free cyanamid into a urea product by an acid agent at approximately a temperature of 70 degrees centigrade, then introducing insoluble phosphates and thereby utilizing the acid agents for the conversion of the insoluble phosphates into soluble phosphates.

3. A process for converting raw cyanamid into a fertilizer consisting in introducing the raw cyanamid in small quantities at a time into water, maintaining the mixture acid by the introduction of gaseous acids which produce insoluble compounds with the metallic impurities in the raw cyanamid whereby there is obtained a solution of free cyanimid, repeating the preceding steps to obtain a concentrated solution of free cyanamid, converting the solution of free cyanamid into a urea product by the introduction of an acid agent at a temperature higher than that of the said mixture, then introducing insoluble phosphates and thereby utilizing the acid agents for conversion of the insoluble phosphates into soluble phosphates.

4. A process for converting raw cyanamid into fertilizers, consisting in introducing the raw cyanamid in small quantities at a time into water, maintaining the temperature of the mixture at 30 to 40 degrees centigrade, maintaining the mixture acid by gaseous acids which produce insoluble compounds with the metallic impurities in the raw cyanamid whereby there is obtained a solution of free cyanamid, repeating the preceding steps to obtain a concentrated solution of free cyanamid, then converting the solution of free cyanamid into a urea product by an acid agent at a temperature of approximately 70 degrees centigrade, and then introducing tricalcium phosphate and utilizing the acid agents for converting the tricalcium phosphate into bicalcium phosphate.

5. A process for converting raw cyanamid into a substance of the type described which comprises introducing the raw cyanamid in small quantities at a time into water, maintaining the mixture acid by the introduction of gaseous acids which produce insoluble compounds with the metallic impurities in the raw cyanamid whereby there is obtained a solution of free cyanamid, repeating the preceding steps to obtain a concentrated solution of free cyanamid and converting the solution of free cyanamid into a urea product by an acid agent at a temperature higher than that of said mixture.

6. A process for converting raw cyanamid into products of the type described which comprises, introducing raw cyanamid in small quantities at a time into water, maintaining the temperature of the mixture between 30 and 40 degrees centigrade, maintaining the mixture acid by gaseous acids which produce insoluble compounds with the metallic impurities in the raw cyanamid whereby there is obtained a solution of free cyanamid, producing a very concentrated solution of free cyanamid by repetition of the preceding steps, and converting the solution of free cyanamid into a urea product by an acid agent.

7. A process of converting raw cyanamid into products of the type described which comprises, introducing raw cyanamid in small quantities at a time into water, maintaining the mixture acid by gaseous acids which produce insoluble compounds with the metallic compounds in the raw cyanamid whereby there is obtained a solution of free cyanamid, producing a very concentrated solution of free cyanamid by repetition of the preceding steps, and converting the solution of free cyanamid into a urea product by an acid agent at a temperature of approximately 70 degrees centigrade.

8. A process for converting raw cyanamid into products of the type described which comprises, introducing raw cyanamid in small quantities at a time into water, maintaining the temperature of the mixture at 30 to 40 degrees centigrade, maintaining the mixture acid by gaseous acids which produce insoluble compounds with the metallic impurities in the raw cyanamid whereby there is obtained a solution of free cyanamid, repeating the preceding steps to obtain a concentrated solution of free cyanamid and converting the solution of free cyanamid into a urea product by phosphoric acid at a temperature of approximately 70 degrees centigrade.

9. A process for converting raw cyanamid into a product of the type described which comprises, introducing raw cyanamid in small quantities at a time into water, maintaining the mixture acid by the introduction of gaseous acids which produce insoluble compounds with the metallic impurities in the raw cyanamid whereby there is obtained a solution of free cyanamid, repeating the preceding steps to obtain a concentrated solution of free cyanamid, and converting the solution of free cyanamid into a urea product by the introduction of an acid agent and bringing the mixture to a temperature of approximately 70 degrees centigrade.

In testimony whereof we affix our signatures in presence of two witnesses.

JOSEPH BRESLAUER.
GEORGES DARIER.

Witnesses:
ERNEST FEHLING,
W. MIER.